(12) United States Patent
LeKachman

(10) Patent No.: US 8,799,163 B1
(45) Date of Patent: *Aug. 5, 2014

(54) SYSTEM AND METHOD FOR FINANCIAL INSTRUMENT PRE-QUALIFICATION AND OFFERING

(75) Inventor: James J. LeKachman, Greenville, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/424,901

(22) Filed: Mar. 20, 2012

Related U.S. Application Data

(63) Continuation of application No. 13/090,665, filed on Apr. 20, 2011, now Pat. No. 8,165,962, and a continuation of application No. 10/654,091, filed on Sep. 4, 2003, now Pat. No. 7,953,663.

(51) Int. Cl.
*G06Q 40/00* (2012.01)

(52) U.S. Cl.
USPC ............... 705/44; 705/35; 705/38; 705/42

(58) Field of Classification Search
USPC .................................................. 705/35–45
See application file for complete search history.

(56) References Cited

U.S. PATENT DOCUMENTS

| | | | |
|---|---|---|---|
| 6,925,439 B1 | 8/2005 | Pitroda | |
| 7,155,411 B1 | 12/2006 | Blinn et al. | |
| 7,308,426 B1 | 12/2007 | Pitroda | |
| 7,310,617 B1 * | 12/2007 | Cunningham | 705/38 |
| 7,349,885 B2 | 3/2008 | Gangi | |
| 7,413,113 B1 | 8/2008 | Zhu | |
| 7,469,151 B2 | 12/2008 | Khan et al. | |
| 7,527,208 B2 | 5/2009 | Hammad et al. | |
| 7,562,818 B1 | 7/2009 | Bierbaum et al. | |
| 7,631,810 B2 | 12/2009 | Liu et al. | |
| 7,644,859 B1 | 1/2010 | Zhu | |
| 7,708,194 B2 | 5/2010 | Vawter | |
| 7,708,198 B2 | 5/2010 | Gangi | |
| 7,712,658 B2 | 5/2010 | Gangi | |
| 7,774,231 B2 | 8/2010 | Pond et al. | |
| 7,822,688 B2 | 10/2010 | Labrou et al. | |
| 7,922,077 B2 | 4/2011 | Humphrey et al. | |
| 7,967,196 B1 | 6/2011 | Bierbaum et al. | |

(Continued)

OTHER PUBLICATIONS

"Credit Scoring Models Should Be Revised for Internet Card Offers", dated Apr. 5, 2000, vol. 15, issue: 7, Publisher: Phillips Business Information.*

*Primary Examiner* — Hai Tran
(74) *Attorney, Agent, or Firm* — Hunton & Williams LLP

(57) ABSTRACT

A computer implemented method for offering financial instruments to pre-qualified consumers is disclosed. The method may include retrieving information for a consumer from a third party; pre-qualifying the consumer for financial instruments offered by a plurality of financial institutions based on the received consumer information; storing, in a database, the consumer information and pre-qualification information indexed using a unique identifier that is assigned to the consumer; receiving, from a business, consumer identification information including a received unique consumer identifier that is collected from the consumer following contact by the consumer with the business; retrieving, from the database, consumer information and pre-qualification information for the consumer using the received unique identifier; checking a suppression database to see if the consumer should not be offered the financial instrument that the consumer is pre-qualified; and offering the financial instrument for which the consumer is pre-qualified to the consumer.

17 Claims, 4 Drawing Sheets

(56) References Cited

U.S. PATENT DOCUMENTS

| | | |
|---|---|---|
| 7,968,215 B2 | 6/2011 | Begley et al. |
| 7,991,694 B2 | 8/2011 | Takayama |
| 8,014,720 B2 | 9/2011 | Lortz |
| 8,020,766 B2 | 9/2011 | Hammand |
| 8,041,338 B2 | 10/2011 | Chen et al. |
| 8,046,257 B2 | 10/2011 | Wane et al. |
| 2002/0077964 A1* | 6/2002 | Brody et al. ............ 705/38 |
| 2002/0138418 A1* | 9/2002 | Zarin et al. ............ 705/38 |
| 2002/0156723 A1* | 10/2002 | Lilly et al. ............ 705/38 |
| 2003/0191556 A1* | 10/2003 | Stiebel et al. ............ 700/219 |
| 2005/0071226 A1 | 3/2005 | Nguyen et al. |
| 2005/0071227 A1 | 3/2005 | Hammad et al. |
| 2006/0165060 A1 | 7/2006 | Dua |
| 2008/0167017 A1 | 7/2008 | Wentker et al. |
| 2008/0208743 A1 | 8/2008 | Arthur et al. |
| 2008/0208762 A1 | 8/2008 | Arthur et al. |
| 2009/0036103 A1 | 2/2009 | Byerley et al. |
| 2010/0125495 A1 | 5/2010 | Smith et al. |
| 2010/0125508 A1 | 5/2010 | Smith et al. |
| 2010/0125510 A1 | 5/2010 | Smith et al. |
| 2010/0131347 A1 | 5/2010 | Sartipi |
| 2010/0198728 A1 | 8/2010 | Aabye et al. |
| 2010/0211507 A1 | 8/2010 | Aabye et al. |
| 2010/0291904 A1 | 11/2010 | Musfeldt et al. |
| 2010/0306076 A1 | 12/2010 | Taveau et al. |
| 2011/0165896 A1 | 7/2011 | Stromberg et al. |

* cited by examiner

SYSTEM AND METHOD FOR FINANCIAL INSTRUMENT PRE-QUALIFICATION AND OFFERING

This application is a continuation (CON) of U.S. patent application Ser. No. 13/090,665 entitled "System And Method For Financial Instrument Pre-Qualification And Offering", filed on Apr. 20, 2011 which is a continuation (CON) of U.S. patent application Ser. No. 10/654,091, filed Sep. 4, 2003, entitled "System And Method For Financial Instrument Pre-Qualification And Offering," the disclosure of which is hereby incorporated by reference in its entirety.

SUMMARY OF THE INVENTION

The invention presents a system and method for financial institutions to make essentially real-time offerings of financial instruments to pre-qualified consumers that are less risky to the financial institution, and also can be more substantial in terms of offered credit to the consumer. The offering is preferably made without a request by the consumer for the financial instrument. In addition, consumers who may not be reachable by other mass marketing tools may be marketed products through the invention. This approach may also be used for marketing financial instruments to consumers for whom mass marketing may otherwise be costly on an incremental basis due to low acceptance rates. To the consumer, the invention provides extremely high approval rates and a wide range of product choices specifically selected for his or her needs and habits.

The invention is related to a system and method for the pre-qualification and the offering of a financial instrument to a consumer. The invention enables the marketing of financial instruments to pre-qualified consumers under circumstances conducive to acceptance of those financial instruments by the pre-qualified consumers. The system of the invention contemplates the pre-qualification of consumers for one or more of a variety of financial instruments. These pre-qualifications are stored in one or more databases and are linked to the identity of the pre-qualified consumer by information that can later be verified. When a consumer contacts an entity operating or otherwise in communication with the system of the invention, a determination is made whether that particular consumer has been pre-qualified to be offered one or more financial instruments. The system may also determine whether one or more of the financial instruments for which the consumer is pre-qualified is appropriate for offering to the consumer, or which of several instruments is most appropriate for offering to the consumer, in the context of the consumer contact. Further checks may be performed at the time of the consumer contact for any indicators that the consumer should not be offered one or more of the financial instruments. The consumer may then be offered one or more of the financial instruments for which he or she has been pre-qualified.

BACKGROUND OF THE INVENTION

Consumers rarely have the time to consult all financial institutions for financial instruments. Often a need for a financial instrument, such as a loan, may arise suddenly and in a location such that the consumer is unable to adequately investigate his or her options. Typically, such a need arises when the consumer is at the point of purchase, without the time or resources to search for ways of financing a purchase. Even more often, the consumer is unable to investigate any options for financing a purchase. In those occasions, the consumer has little or no ability to access financial institutions to make inquiries on how best to finance a purchase. Additionally, consumers may not realize that they have options in financing purchases. In addition, it is costly for financial institutions to mass market financial products and instruments to consumers due to the relatively low acceptance rate of such offers, which creates a high incremental marketing cost per accepted offer.

In addition, existing regulations on the handling of consumer credit information limit the access and use of consumer credit information by entities that access consumer credit information from credit bureaus. For example, under current U.S. federal regulations, an entity that is not an agent of a credit bureau that takes possession of the name, address and credit information of a specific individual is committed to make that individual a firm offer of credit. These and other regulations on the access and use of individual's credit information from credit bureaus result in inefficient marketing of financial products to qualified individuals.

In order to better meet consumer expectations and to enhance an entity's marketing of financial products to qualified individuals, it would be desirable for financial institutions to have the ability to offer pre-qualified consumers customized financial instruments in essentially real time at the time that the consumer is most likely to be receptive to an offer, as many consumers do not, or may not, realize their financial needs until they need credit, such as for example when making a purchase. Today, financial instrument offerings that may be offered to consumers in essentially real time and substantially at the time of the request are often limited in the amount of offered credit due to the time required for financial institutions to conduct any qualification procedures. Under tight time constraints, financial institutions often offer very conservative financial instruments to consumers. Even at conservative levels, such financial instrument offerings may be risky to the offering financial institutions due to the inability to thoroughly check and/or confirm the requesting consumer's credit-related information.

Systems and methods for offering financial instruments to consumers have been disclosed in the art. For example, U.S. Pat. No. 5,870,721, issued to Norris and titled "System and Method for Real-Time Loan Approval," the disclosure of which is herein incorporated by reference in a manner consistent with this disclosure, discloses a method and system for automatic processing of a loan application. An applicant for a loan interfaces with a programmed computer processor. The applicant provides data to the processor, which then determines the information needed to process the loan, determines whether to approve the loan and effects electronic transfer to the applicant's account. The process is completed without human intervention, and the processor utilizes a neural network with input obtained in part from the applicant and in part from databases accessed by the computer, such as credit bureaus to obtain a credit report.

U.S. Pat. Nos. 5,940,811 and 6,105,007, both issued to Norris, and titled "Closed Loop Financial Transaction Method and Apparatus" and "Automatic Financial Account Processing System," respectively, the disclosures of which are herein incorporated by reference in a manner consistent with this disclosure, disclose a method and system for closed loop, automatic processing of typical financial transactions, including loans and setting up checking, savings and individual retirement accounts, obtaining cashier's checks, ordering additional checks, issuing credit and debit cards and wire transferring money. The systems operate with no human intervention. An applicant obtains information needed to process the application, and the processor decides whether to approve the application, effects electronic fund transfers, controls documentation requirements and obtains acknowledgement of acceptance of terms from the consumer by having the consumer sign an electronic signature pad.

BRIEF SUMMARY OF THE INVENTION

The invention allows a financial institution to leverage the vast number of customer and prospect contacts that it and its strategic partners experience every day to create a highly efficient new acquisitions channel. The financial institution is enabled to market a financial product, specifically tailored to the needs of the consumer or prospect, in real time at a point of contact when the consumer or prospect is most receptive to that offer. The invention makes use of the financial institution's knowledge about profitability, attractiveness of offer, and likelihood of a consumer to respond and be approved that it builds into its other channels.

The invention differs from existing marketing channels because it leverages a third party vendor, such as a credit bureau or an agent of the credit bureau, to house a database of eligible consumers. The financial institution does not take possession of the consumer's credit data until the consumer contacts it or one of its business partners. The financial institution offers the consumer the financial instrument only it is confident that the consumer is qualified for that financial product. The invention allows a financial institution to market virtually all of its consumers without having to resort to currently used (and expensive) channels such as mail, telemarketing or email. By marketing financial products only to consumers who pass the financial institution's criteria for a certain financial instrument, and who have already come in contact with the financial institution or one of its business partners, the financial institution generates significantly lower acquisition cost for each consumer and creates a superior customer experience.

Consumer information may be housed in a file in a database located at a third party vendor without taking possession of the data. The financial institution then creates an interface to the database from any contact point such as the Internet, call centers, registration counters, business partner locations or banking branches. Once a consumer contacts the financial institution or its business partner, that consumer's identification information is used, either by the financial institution or by a third party vendor, to see if the consumer is found in the database. If a match can be made to a file in the database, and the consumer is eligible for one or more financial products, the financial institution or the third party vendor may run a real time pre-screen of the prospect by a credit bureau or scorer to see if the consumer's status has changed since the database was created. If the consumer passes the pre-screen, then the financial institution retrieves the file and makes an offer to the consumer. If the database is located at a third party vendor, the third party vendor sends back a message to the financial institution containing the offers available. The financial institution then takes possession of the data and makes an offer to the consumer.

These offerings can be made practically instantaneously at a point of contact with the consumer, which may be at, for example, the financial institution, a point of sale at a store, a telephone operator for the financial institution or for one of its business partners, the location of a broker or other agent that may be assisting or otherwise obtaining a financial offering for a consumer, the Internet web page of a financial institution or a banner hyperlink from a business partner to the web page of a financial institution. The point of contact may be with a human operator of the system, or may include electronic communication directly between the system and the consumer.

The system and method of the invention operates by identification of the consumer prior to the time of consumer contact with the financial institution operating the system or with one of its business partners that is in communication with the system. The financial institution searches for and accumulates information relating to the identified group of consumers and determines each consumers' qualification for specific financial instruments based on that accumulated information. The information may be stored in a database or databases accessible by the operator of the system. Alternatively, the financial institution may identify consumers and gather consumer information and provide it to a third party, such as a credit bureau or scorer, and the third party may run the qualification according to the standards of the financial institution and maintain the stored consumer information. In yet another embodiment, the financial institution may provide the third party with its standards for pre-qualifying consumers for financial products, and the third party may identify consumers, gather consumer information, pre-qualify consumers according to the standards of the financial institution and maintain stored consumer information.

Consumer information may be gathered by the financial institution or the third party according to well-known methods, such as from existing customer accounts or credit bureaus or scorers. Methods well known to those skilled in the art may be used to make such qualification determinations. Stored consumer information may be retrieved periodically for re-qualification of the consumer. Qualification may take place on any periodic basis, and preferably occurs approximately every thirty (30) days. However, the system contemplates frequent updates and other checks in order to identify consumers that were previously qualified but have since that time become undesirable candidates for a financial offering. If a consumer is found to be unqualified during this interim period between qualification processing of consumers, a hold or other flag may be entered into the system to indicate that a consumer should not be offered one or more of the financial instruments for which he or she had previously been determined to be pre-qualified.

Each consumer is typically identified by one or more unique identifiers that relates to some customer information, such as address, phone number, and/or social security number. Consumer information, including the financial instrument offer or offers, should be stored in a manner such that it may be searched and located at least according to one unique consumer identifier.

A consumer who desires an offer or offers of a financial instrument may express that interest at a point of contact. Alternatively, the system may determine, depending on the nature of the purpose for the contact of the system by the consumer, that one or more particular financial offerings may be advantageous for the consumer, and offer it to the consumer without a request by the consumer for a financial instrument.

At the point of contact, sufficient consumer information is gathered from the consumer and input into the system such that the system can determine the unique identifier of the consumer. If the stored consumer information is maintained by a third party, the system may transmit sufficient gathered consumer information to the third party so that the third party can determine the unique identifier of the consumer. Alternatively, the system may determine the unique identifier and transmit it to the third party. In some embodiments, consumer information may be retrieved by a business partner from an existing database that may have already accumulated that information in relation to another program, such as a loyalty program, reward program, customer account, or warranty program. The business partner may determine the unique identifier and communicate it to the financial institution, or may pass on the consumer information to the financial institution for determination of the unique identifier. The stored consumer information is then searched using the determined unique identifier.

Authentication of the consumer may be required, and may be performed using some of the consumer information gathered from the consumer at the point of contact. Authentication may also be performed by a business partner, if the consumer is contacting the financial institution through a business partner. Authentication information can be stored as part of the stored consumer information, and is then accessible using the unique identifier of the consumer. Either the system may retrieve authentication information from the stored consumer information and compare to received authentication information, or the system may transmit authentication information received from the consumer on to the third party that maintains the stored consumer information. In this embodiment, the third party will retrieve authentication information from the stored consumer information and compare to the received authentication information. If the consumer makes live contact at the point of contact, authentication may be performed by a check of the consumer's identification.

Once the consumer has been authenticated, other consumer information can be retrieved including the financial instruments that have been pre-determined for offering to the consumer. One or more of the pre-determined financial instruments can then be offered to the consumer essentially instantly. Alternatively, the system may further check either its own database or commercially available databases, such as credit bureaus or scorers, prior to offering the financial instrument to the consumer for any further information that indicates that the consumer may no longer be qualified to receive the offer. If a consumer accepts the offer or offers of the financial instrument, this information preferably is routed back into the system to update the consumer's file. The system may be available virtually 24 hours a day, 7 days a week.

One advantage of the system is that consumers may be approached only for those financial instruments for which they are pre-qualified to receive. Consumers can feel rejected by a financial institution if they make a request for a financial instrument, and then are turned down. In the invention, the consumer typically does not make a request for the financial instrument, and is informed only of those financial instruments for which he or she has already been approved by the financial institution. This increases loyalty to the financial institution as well as a business partner that may have put the consumer in communication with the system.

One object of the invention is to provide real-time offerings of financial instruments to consumers without a request for the financial instrument from the consumer.

Another object of the invention is to increase response rates of marketed financial products by offering customized financial instruments to consumers who may not request a financial instrument, but who have been determined to be pre-qualified for the offered financial instrument.

Another object of the invention is to reduce incremental costs of adding new consumer accounts to a financial institution from the marketing of financial instruments to pre-qualified consumers.

Yet another object of the invention is to offer higher value financial products to consumers with lower risk to financial institutions than current instant credit decisioning systems.

Yet another object of the invention is to offer a higher value, lower risk financial instrument to a consumer at a point when that consumer may be most receptive to accepting the offer.

Yet another object of the invention is to increase consumer loyalty to a financial institution, and its business partners, by increasing business at both entities due to the synergy of the availability of high-quality financial products in conjunction with a purchase from a business partner of the financial institution.

Yet another object of the invention is to increase consumer loyalty to a financial institution, and its business partners, by marketing financial instruments to consumers without rejecting a consumer's request for a financial instrument.

Another objective is to be able to cross-sell financial products using an already established customer relationship.

Another objective is to be able to offer any financial product where the risk to the financial institution of making the offer would benefit from a risk based or credit score or credit bureau evaluation.

These and other objects will become apparent to those of ordinary skill in the art through the description provided below.

BRIEF DESCRIPTION OF THE DRAWINGS

The invention will be described with reference to the accompanying drawings, in which like elements are referenced with like numerals.

DETAILED DESCRIPTION OF THE INVENTION

Figure 1:
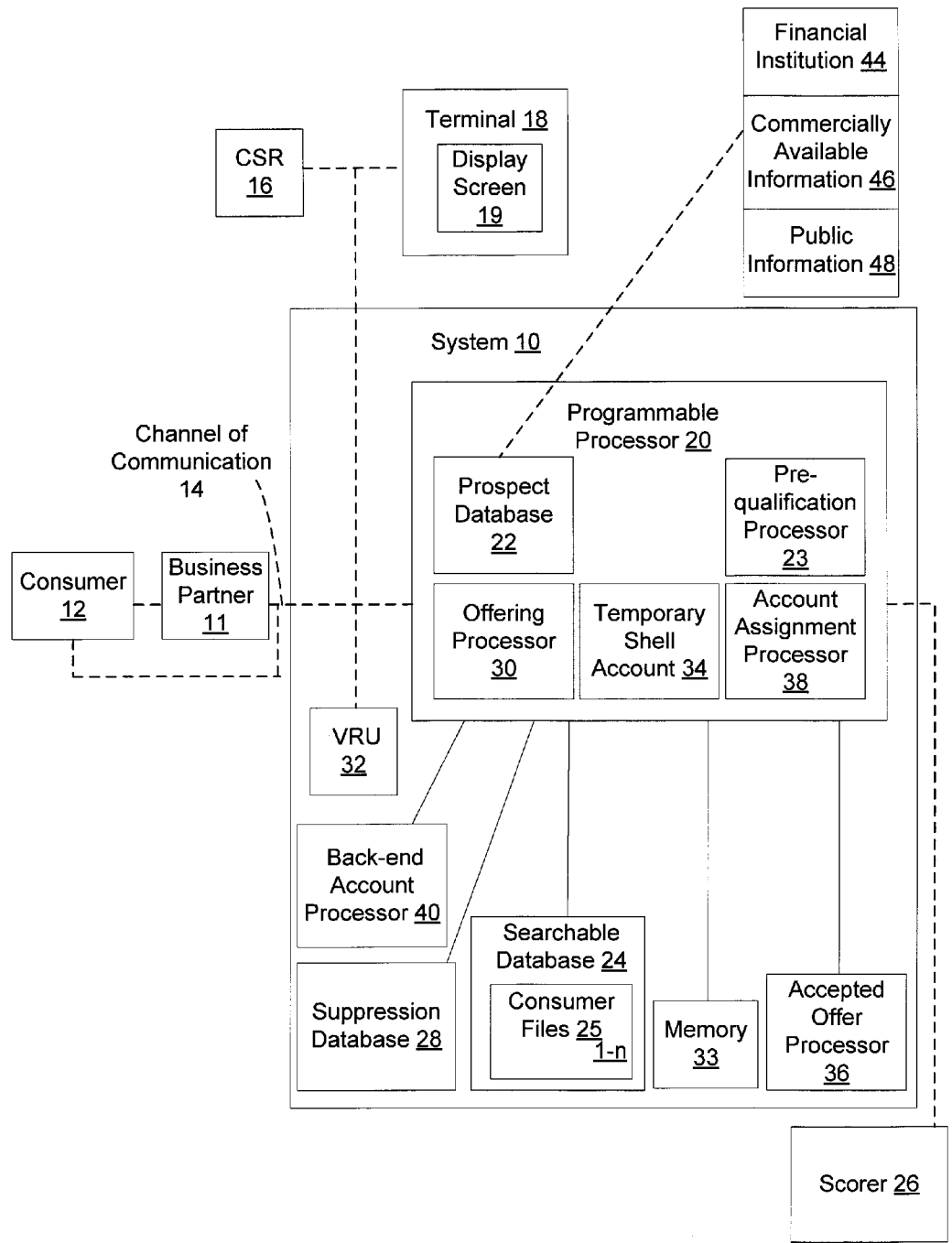
FIG. 1 is a schematic of one embodiment of the system where the system maintains the consumer files and determines if a consumer may be offered a pre-qualified financial instrument.

The invention comprises a system and method for financial institutions to make essentially real-time offerings of financial instruments to pre-qualified consumers that are less risky to the financial institution, and also can be more substantial in terms of offered credit to the consumer. The types of financial instruments that can be offered using the invention are not intended to be limited by this disclosure, and include all financial instruments for which credit bureau data is predictive. The types of financial instruments that may be offered through the invention include transaction cards, credit cards, loyalty cards, co-branded cards, debit cards, rewards card, "smart" cards, mortgages, second mortgages, home equity lines of credit, consumer loans, new or used automobile loans, loans on investment or real property as collateral, margin accounts, business loans, mutual funds, insurance or any other type of financial product. Also, rewards features associated with the financial instruments may be offered.

These offerings are preferably made practically instantaneously at a point of contact with the consumer, which may be at, for example, the financial institution, a point of sale at a store, a telephone operator for the financial institution or for one of its business partners, the location of a broker or other agent that may be assisting or otherwise obtaining a financial offering for a consumer, the Internet web page of a financial institution or a banner hyperlink from a business partner to the web page of a financial institution. Point of contact is meant to include substantially any location from which a consumer may be inquiring into the availability of financial instruments, or may be inquiring about a purchase or investment or other transaction for which a financial instrument may be advantageous. Purchases may include purchases of consumer goods, such as computers or boats; purchases of a time share; purchases of services, such as an airline flight or a hotel room; or purchases of other financial instruments, such as financial investments as mutual funds or insurance. In one embodiment of the invention, the purchase is charged to the financial instrument, if the financial instrument involves the extension of credit and the financial instrument is accepted by the consumer.

The system and method of the invention offers financial instruments to consumers in essentially real-time because the financial institution has, prior to the time of contact by the consumer, identified the consumer, accumulated information relating to that consumer that is used to determine the consumer's qualification for specific financial instruments, selected an optimal offer or offers for that consumer and stored at least part of this information including the financial instrument offer or offers that the consumer is qualified to be offered in a manner that may be accessed practically in real time.

In a preferred embodiment of the system, the system comprises a programmable data processor capable of receiving inquiries from a point of contact, whether input by a representative of the financial institution or a business partner of the financial institution, or directly by a consumer. The programmable data processor may include a VRU to allow a consumer to communicate with the financial institution regarding a financial instrument without having to contact a live operator. Alternatively the programmable data processor may be capable of switching the consumer to a live operator for real time communication. Such automated and operator-attended systems are well known in the art.

In an embodiment where the system maintains the stored consumer information, the system preferably includes one or more searchable databases capable of storing consumer files according to at least the unique identifier of the consumer. The system should also be capable of routing consumer information, or at least the unique identifier, to the searchable database from the consumer point of contact. In this embodiment, the system may include a processor capable of determining a unique identifier based on consumer information. The system also includes an analyzer capable of acquiring consumer information from an outside source or from within the stored consumer files, and determining according to predetermined conditions what financial instruments may be offered to identified consumers. For example, a consumer that accepted a home equity line of credit may no longer be eligible for a consumer loan of a certain amount. Other financial instruments may require a minimum credit rating or income level for qualification. These predetermined conditions may be altered according to the requirements of the financial institution. The various components of the system preferably may be in communication with each other as necessary to allow the sharing of consumer information to facilitate the operation of the system and method. Other variations of the system may be included. For example, the system may be capable of communicating with outsourced information management companies for account maintenance and for processing of consumer requests.

In another embodiment, a third party has gathered consumer information and pre-qualified consumers using standards provided by the financial institution operating the system, and maintains the stored consumer information where it may be accessed using a unique identifier of the consumer. The stored consumer information may include authentication information and details of the financial instruments that the consumer has been pre-qualified to be offered. The system gathers sufficient consumer information when contacted by a consumer to determine the unique identifier of the consumer and perhaps also authentication information, and transmits that information to the third party. Alternatively, if the consumer contacts the system through a business partner of the financial institution, the business partner may authenticate the consumer and may also retrieve previously stored consumer information sufficient to determine the unique identifier. Such consumer information may be stored, for example, in a loyalty program database of the business partner. The third party then locates the consumer file using the unique identifier, and retrieves the stored consumer information if authentication is successful. If the consumer has been pre-qualified for a financial instrument, that information is transmitted back to the system and the financial instrument may be offered to the consumer if further checks indicate that the consumer is still qualified to be offered the financial instrument. The offer may be made in essentially real time through the use of modern communication systems for communications between the system and the third party.

Although the system and method may operate by any architecture that allows data to be accessed, including communication via in person contact, telephone or any other wired or wireless connection, a preferred method of operation is via the use of high-speed computer connections, where computers may be networked or may communicate over any other system such as the Internet or Ethernet. Consumer information may be gathered according to well-known methods, or methods later developed. Such methods include information gathered from existing customer accounts or credit bureaus or scorers. The term credit bureaus or scorers is intended to mean any business or organization that collects and/or maintains consumer credit information, among other functions. Examples of credit bureaus or scorers include Experion™, Equifax™, TransUnion™ and Fair Isaacs™.

In one embodiment, the system analyzes the accumulated consumer information for each identified consumer for purposes of determining whether the consumer qualifies for one or more financial instrument offers, and also identifies which offer or offers each consumer qualifies for. Qualification may address parameters associated with a financial instrument, such as interest rate, associated rewards program, amount of credit, term of credit extension, level of return on investment, amount of insurance coverage, or category of consumer in loyalty program (for example, if the consumer is a member of the silver, gold or platinum program and may include different benefits for different categories).

In another embodiment, a third party accumulates and analyzes the consumer information for each identified consumer using standards provided by the financial institution that will be offering the financial instrument for determining whether the consumer qualifies for one or more financial instrument offers. Such methods of qualification are well known to those skilled in the art and typically include consideration of the risk factor for the financial institution. The consumer information may be analyzed for qualification before any information is stored in the consumer file, and may also be retrieved periodically and updated by newly accumulated information and/or for re-qualification of the consumer.

Other information may be stored and may be linked to one or more pre-qualified financial instruments. For example, the financial institution or third party may analyze the projected value of each financial instrument for which a consumer is pre-qualified, which information may be stored in the consumer file.

Each consumer that qualifies for a financial instrument offering should be linked to a unique identifier that typically relates to some personal customer identification information, such as address, phone number, and/or social security number. Typically, the unique identifier must be ascertainable when a consumer provides his or her personal identification information at a later date or may be ascertainable from similar previously stored consumer information. At least some of the consumer information, including the financial instrument offer or offers, is stored in a manner such that it may be searched at least according to at least one unique consumer identifier. In addition, other confidential consumer information may be stored in the file for purposes of authentication of the consumer at a point of contact. In one embodiment, there may be multiple consumer files that store various portions of the consumer information.

The consumer information stored in the files may be updated on any basis, whether regularly or at will of the financial institution. More frequent updates are preferable in order to maintain current information that may affect a consumer's continuing qualifications for a financial instrument offer or offers. The number of updates of consumer information may be selected by the financial institution as desired.

A consumer who desires an offer or offers of a financial instrument may express that interest at a point of contact. The point of contact may be directly at the financial institution where the consumer comes in live contact with a financial institution representative. Alternatively, the consumer may contact the financial institution over the telephone, the Internet via the web page of the financial institution, a banner hyper-link to the financial institution from another web page, or any other form of communication, wired or wireless, now known or later developed. Alternatively, the consumer may come in live contact with a representative of a business partner of the financial institution, whether in person or through a wired or wireless communication. Examples of such business partners may include businesses that have a relationship with the financial institution such that the business partner either exclusively or nonexclusively offers its customers financial instruments sponsored by the financial institution, such as loyalty or cobranded credit cards or other types of incentive programs that encourage a customer to use a particular financial instrument.

However, consumers may be offered financial instruments even if no direct inquiry is made at the point of contact, if the consumer has been pre-qualified for a financial instrument. The system may also determine whether the offering of a pre-qualified financial instrument is appropriate at that time according to pre-determined conditions. Factors determining whether a financial instrument should be offered may include the nature of the inquiry made by the consumer at the point of contact. For example, a consumer who is inquiring about purchasing a boat or car or other vehicle may be offered a general consumer loan or even a home equity line of credit. Other pre-determined conditions may include the source of the point of contact. For example, a consumer who comes into contact with the system through a business partner may be offered that business partner's cobranded credit card. A consumer who comes into contact with the system through a time-share sales location may be offered financing for the purchase of the time share. A consumer who comes into contact with the system through an airline may be offered the airline's cobranded credit card.

At the point of contact, sufficient consumer information is gathered from the consumer and input into the system, whether by the consumer directly or by a representative at the point of contact, such that the system can determine the unique identifier of the consumer. If the stored consumer information is maintained by a third party, the system may gather consumer information and transmit it to the third party such that the third party can determine the unique identifier. Alternatively, the system may determine the unique identifier and transmit it to the third party. Also contemplated is that the unique identifier may be determined using consumer information previously stored by a business partner, perhaps in association with a loyalty program, reward program, customer account, or warranty program. The business partner may have a file in a database associated with that consumer prior to contact with the system. Either the business partner may determine the unique identifier, or the business partner may communicate consumer information to the system for determination of the unique identifier. In that case, there is no need to query the consumer for this information.

The unique identifier may be the consumer's name, address, phone number or Social Security number. Unique identifiers may also be created through the use of commercially available algorithms that calculate a unique number based on a consumer's personal identification information. Examples of such algorithms include Decision Power™ operated by Equifax™, Knowledge Broker™ operated by Acxiom™ and Transact™ operated by Experion™. The method of determining the unique identifier must be related to the same manner that it was determined for purposes of storing consumer information by the financial institution or third party.

The stored consumer information is searched using the unique identifier for a consumer file indexed using that unique identifier. If a positive match is made by locating a consumer file having the unique identifier, the system or third party may require further authentication of the consumer by known means before stored consumer information is retrieved. For example, the consumer may be asked to present picture identification, if the consumer comes into direct contact with a representative of the financial institution or a partner of the financial institution. Another method of identifying or authenticating the consumer may be biometrics; such as fingerprints, retinal scan, DNA, facial matching, etc. Other forms of authentication can also be used, such as the use of passwords or security questions. If the consumer has contacted the financial institution or a business partner of the financial institution via a telephone, the operator may ask the consumer one or more questions that must be correctly answered for authentication. Alternatively, the system may detect the consumer's incoming telephone number using Automatic Number Identification (ANI) technology and may authenticate the consumer automatically by comparing the calling number to other identification provided by the consumer upon contact. If the consumer has contacted the financial institution or a business partner of the financial institution through a VRU, the consumer may be switched to talk to a live operator for authentication purposes. Yet other authentication measures may be used. For example, over the Internet, the consumer may be asked to provide several numbers of his or her Social Security number or date of birth or home telephone number for authentication. Also, the consumer may be authenticated by use of a "cookie" placed on the consumer's browser during previous contacts with the system or financial institution. Authentication may be performed by a business partner, using consumer information previously stored in its own databases such as for a loyalty program.

Once the consumer has been authenticated, the consumer information that is stored in the file is retrieved including the financial instrument offer or offers that the financial institution or third party has pre-determined may be offered to the consumer. The pre-qualified financial instrument can then be offered to the consumer essentially instantly because no further credit or other information must be verified, since these verifications have already taken place. However, additional checks may be run on the pre-qualified consumer, before the actual offering of the financial instrument to the consumer.

In addition, the system or the third party may have a separate "suppression" database that includes information indicative of whether previously qualified consumers have, since pre-qualification, become unqualified for a financial instrument for any reason. Examples of information that may be maintained in the "suppression" database include the names of consumers who have opted out of sharing information for marketing purposes with credit bureaus or scorers; consumers that have recently responded to other offers of financial instruments by the financial institution; consumers whose credit lines with the financial institution have shifted recently; bankruptcy filings; or lower credit ratings due to increased debt or missed payments. This suppression database may also be checked prior to the offer of the financial instrument to the consumer. Alternatively to checking the suppression database in real time, the information in the suppression database may be periodically compared in batch operations to the consumer files holding the pre-qualification information, and a consumer's file or only certain pre-qualified offers in that consumer's file may be "flagged" to indicate it should be suppressed without altering the stored information in the file. The flag indicates that the consumer should not be offered one or more financial instruments. In addition, a fraud check may be run on the consumer by either the system or by a third party using techniques well known to those skilled in the art.

Alternatively, consumer requests may be collected and the stored consumer information retrieved in a batch operation by either the system or the third party. Such batch operation is still quicker than other systems used today because the offers of financial instruments can be made, either via a communication sent to the inquiring consumer or saved in the consumer file until further inquiry by the consumer, simply upon the operation of the system with no further verification or information gathering required. Thus, the system may operate during off-business hours and still provide real time, or nearly real time, service.

If a consumer accepts the offer or offers of the financial instrument, the system may request additional information to complete the application. In addition, the consumer will likely be informed of certain terms and conditions or needed agreements, which may be required by regulation prior to final acceptance of the offer. This information preferably is routed back into the system to permanently process the application. Also, the acceptance information may be updated in the consumer's file or the "suppression" database such that the consumer's eligibility, if any, may be re-determined or "flagged" to prevent further financial instrument offerings, at least until the consumer is again pre-qualified using this new information.

The system may be available virtually 24 hours a day, 7 days a week. The consumer information may be updated periodically, and may be updated in batches rather than at one time. For example, consumers with last names starting with different letters, such as A through F, may be updated the first week of every month. Alternatively, consumers may be ranked according to creditworthiness such that the consumer information of consumers with lower-ranked creditworthiness is updated more frequently than better qualified consumers. In addition, updates to the system for consumers that have accepted other financial instruments, or have otherwise become unqualified for a financial instrument offering, may be done daily or even more often. Such updates may include placing "flags" on those consumer files marked as now-unqualified, while not deleting the information from the system regarding the original qualification. Examples of such updates may include consumers who have filed bankruptcy, or who have become delinquent in payment, or any other indicator that may indicate unworthiness for further financial extension.

The advantages of the system include lower risk to the financial institution due to pre-qualification of consumers for certain financial instruments; greater consumer satisfaction due to the speed of "approval" as well as typically higher credit offerings; and the ability for a financial institution and a business partner to instill customer loyalty and increase participation in incentive programs by offering consumers essentially real time financial instruments without rejecting consumers. Such advantages may be realized by lowering costs to maintain consumer accounts as well as improved customer relations. In addition, consumers who may not be contacted directly in direct marketing campaigns may be offered financial products using the invention.

Turning to the figures, FIG. 1 is a schematic of one embodiment of the system where the stored consumer files are maintained at, and the consumer pre-qualification is performed by, the financial institution. A consumer 12 connects to the system 10 through some channel of communication 14. This contact may be through a business partner 11. The channel of communication 14 may be in person, via a telephone line, an Internet connection, Ethernet, LAN, WAN, cellular connection, any wireless connection, microwave communication or any other form of communication now known or later developed. Typically, upon connection to the system 10, the consumer 12 is put into contact with a Customer Service Representative ("CSR") 16. The consumer's incoming call may be routed through an Automatic Call Distributor, or PBX exchange, or any other method to interface calls and distribute them within a system.

In one embodiment, the call is routed to a CSR 16, who is connected to the system 10 through a terminal 18 having a display screen 19. The CSR 16 may take information from the consumer 12 for identification and authentication purposes, such as account information, name, address, telephone number, email address or any other information that may be used to identify the consumer. Alternatively, the system 10 may communicate electronically with the consumer 12 through a Computer Telephony Interface ("CTI") (not shown), which may operate using call center technology well known in the art. The consumer 12 may be authenticated automatically using ANI to automatically detect the incoming call origination number if the consumer 12 connects to the system 10 using a telephone connection. The consumer 12 may be authenticated automatically through the use of "cookies" if the consumer connects through the Internet, and the system 10 previously placed a "cookie" on the browser from which the consumer 12 contacts the system. Alternatively, the consumer 12 may be authenticated by a business partner 11 prior to contact with the system 10 using information stored in its own databases, such as for a loyalty program or warranty program.

The CSR 16 may also have the capability through the terminal 18 to input information into the system 10 relating to the purpose of the consumer 12 contact. For example, the consumer 12 may have contacted a business partner 11 in communication with the system 10 to purchase an item, such as a computer. The purpose of the consumer contact would therefore be to purchase a consumer good, such as a computer. Alternatively, the consumer 12 may wish to book a flight or hotel room, or purchase a time share property. Other purposes may be to check on an account balance at the financial institution, or to close an existing account. If the system 10 is operating using CTI, the reason for the consumer contact may be indicated by the consumer 12 by either inputting signals in response to prompts or otherwise allowing the system 10 to utilize voice recognition technology to ascertain the customer contact purpose.

The system includes a programmable processor 20, which communicates with the CSR terminal 18 or otherwise is in communication with the caller via CTI. In this embodiment, the programmable processor 20 includes a prospect database 22 which includes information relating to creditworthiness of consumers 12 to be pre-qualified, as well as the identity of those consumers 12. A pre-qualification processor 23 may be programmed to apply pre-determined conditions to the consumer creditworthiness information in prospect database 22 to determine if, and for what, financial instruments a consumer 12 may be qualified to be offered. The programmable processor 20 is also in communication with a searchable database 24 which stores consumer files $25_{1-n}$. The consumer files $25_{1-n}$ are indexed according to unique consumer identifiers, which identifiers may be recognized or developed from consumer identification information. For example, the unique identifier may be the consumer's calling number, which may be determined by ANI. Other consumer identification information may be input into the system 10 by either the CSR 16 or by use of CTI technology. The consumer 12 may be authenticated by the business partner 11 using information stored in a database of the business partner.

The unique identifier is linked to a consumer file $25_i$, which has stored consumer information such as authentication information, pre-qualified financial instruments for that consumer as determined by the pre-qualification processor 23 and any other information that the system 10 desires to store in the consumer file $25_i$. The consumer 12 typically is prompted by a voice response unit ("VRU") 32, or asked by the CSR 16, to provide some other information confidential to the consumer 12, such as a password, PIN, last 4 digits of his or her Social Security Number or any other security information. The consumer 12 may also be authenticated in person by a check of the consumer's identification. The entered authentication information is compared to stored authentication information in the consumer file $25_i$. If the comparison is favorable, the consumer 12 is authenticated.

Once authentication is confirmed, the system 10 checks the consumer file $25_i$ to see if that consumer 12 has been pre-qualified for any financial instruments. If so, the system 10 may check with at least one credit bureau or scorer 26 to confirm the consumer's most current credit rating, and may also check a "suppression" database 28 that has identified consumers 12 that have become unqualified for financial offerings. In addition, the system 10 may run a fraud check on the consumer at this time. If the check at the credit organization 26, "suppression" database 28 and the fraud check are clear, this means that the consumer 12 is still qualified to be offered one or more financial instruments for which the consumer 12 was previously pre-qualified.

The system 10 may include an offering processor 30 that may be programmed to determine, according to the purpose of the consumer contact or any other predetermined conditions that the system operator may wish to include, whether a pre-qualified financial instrument should be offered to the consumer 12 during that contact. Pre-determined conditions may include such items as start date and expiration date of offers, or the channel or location of consumer contact.

Once the system 10 has determined that the consumer 12 should be offered a financial instrument, the offer of the financial instrument is made to the consumer 12 either by the CSR 16 or through VRU 32 in communication with the programmable processor 20. The consumer 12 may indicate acceptance or refusal of the offer of the financial instrument either to the CSR 16 or by indicating by voice or by signal input through CTI his or her decline of the offer. The acceptance of the offer is preferably noted in the suppression database 28 so that the consumer 12 will not be made additional offers of financial instruments without re-qualification.

If the consumer 12 accepts the offer, the acceptance is noted and stored in the consumer file $25_i$. Acceptance may also be stored in the "suppression" database 28 at least until qualification of the consumer is re-performed. The CSR 16 or the voice response unit 32 informs the consumer 12 of any required financial disclosures according to the accepted financial instrument, and records the consumer's acceptance of any terms. Alternatively, any necessary disclosure may be performed by other methods such as providing the consumer 12 a form containing the disclosures to print out, sign and fax back; directing the consumer 12 to a web page where he or she may indicate acceptance of the terms and conditions; or emailing the consumer 12 and allowing acceptance of the terms and conditions in a return email. This acceptance may be stored in the consumer file $25_i$. Alternatively, the acceptance may be stored in a memory 33 for later batch processing to update the consumer file $25_i$.

In one embodiment, the programmable processor 20 may include a database for storing a temporary shell account 34 for the financial instrument. Further, the system 10 may include an accepted offer processor 36 that determines the amount of the credit extended to the consumer 12 through the accepted financial instrument. The temporary shell account 34 may allow the consumer 12 to place a current charge to the accepted financial instrument, which may be stored until the permanent processing of the account takes place. The programmable processor 20 may also include an account assignment processor 38 that assigns an account number to the accepted financial instrument so that the consumer 12 may begin using any extended credit immediately.

Typically, the system 10 also includes a back-end account processor 40 that conducts the permanent processing of the accepted financial instrument. Such back-end processing includes a fraud check and preparation of a physical credential, such as a credit card, card member agreement or payment book, and other "welcome" information typically provided to consumers upon opening of a financial account.

The prospect database 22 typically accesses consumer information from a variety of sources. Such sources may include records of the financial institution 44, commercially available information 46 or other public information such as telephone or real estate records in locales, or court records 48. The pre-qualification processor 23 is programmed to evaluate the consumer information for creditworthiness for financial instruments for each consumer, and typically refers to information such as credit information available from credit organizations 26. In one embodiment of the system 10, the pre-qualification processor 23 pre-qualifies substantially all consumers for which it has consumer information for some financial instrument, thus increasing the probability of gaining a new customer account.

Figure 2:
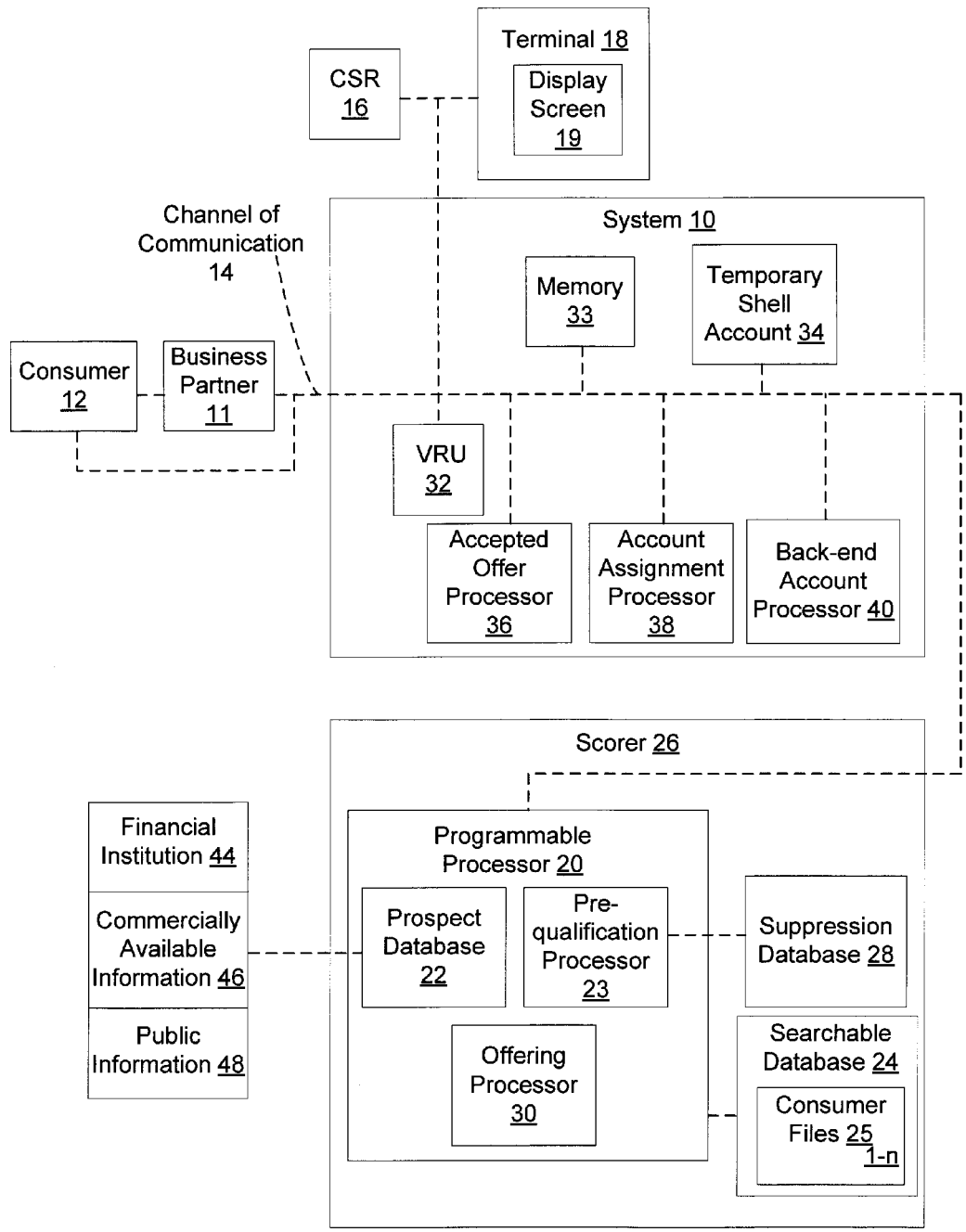
FIG. 2 is a schematic of another embodiment of the system where a third party maintains the consumer files and determines if a consumer may be offered a pre-qualified financial instrument.

Turning now to FIG. 2, another embodiment of the system 10 of the invention is depicted where the stored consumer files are maintained, and the pre-qualification of the consumers are performed, by a third party such as a credit bureau or scorer 26. As in the embodiment shown in FIG. 1, a consumer 12 connects to the system 10 through some channel of communication 14. This may include contact through a business partner 11. Again, the consumer 12 is put into contact with a Customer Service Representative ("CSR") 16, who is connected to the system 10 through a terminal 18 having a display screen 19. As before, the CSR 16 may take information from the consumer 12 for identification and authentication purposes, such as account information, name, address, telephone number, email address or any other information that may be used to identify the consumer 12. Alternatively, the system 10 may communicate electronically with the consumer 12 through a Computer Telephony Interface ("CTI") (not shown), which may operate using call center technology well known in the art. The consumer 12 may be authenticated automatically using ANI to automatically detect the incoming call origination number if the consumer 12 connects to the system 10 using a telephone connection. The consumer 12 may be authenticated automatically through the use of "cookies" if the consumer connects through the Internet, and if the system 10 previously placed a "cookie" on the browser from which the consumer 12 contacts the system. In other embodiments, the consumer 12 may be authenticated by the business partner 11 prior to contact with the system 10, which may occur using consumer information previously stored in a database of the business partner 11 such as a loyalty program database.

The CSR 16 may also have the capability through the terminal 18 to input information into the system 10 relating to the purpose of the consumer 12 contact. For example, the consumer 12 may have contacted a business partner in communication with the system 10 to purchase a consumer good, such as a computer, or book a hotel room or flight, or purchase a time share property. Other purposes may be to check on an account balance at the financial institution, or to close an existing account. If the system 10 is operating using CTI, the reason for the consumer contact may be indicated by the consumer 12 by either inputting signals in response to prompts or otherwise allowing the system 10 to utilize voice recognition technology to ascertain the customer contact purpose.

The system 10 is in communication with the system of a third party 26 which maintains a programmable processor 20 including a prospect database 22 that stores information relating to creditworthiness of consumers 12 to be pre-qualified, as well as the identity of those consumers 12. A pre-qualification processor 23 may be programmed to apply pre-determined conditions of the offering financial institution to the consumer creditworthiness information in prospect database 22 to determine if, and for what, financial instruments a consumer 12 may be qualified to be offered. The programmable processor 20 is also in communication with a searchable database 24 which stores consumer files $25_{1-n}$. The consumer files $25_{1-n}$ are indexed according to unique consumer identifiers, which identifiers may be recognized or developed from consumer identification information. For example, the unique identifier may be the consumer's calling number, which may be determined by ANI. Other consumer identification information may be input into the system 10 by either the CSR 16 or by use of CTI technology. Alternatively, the business partner 11 may determine the unique identifier using consumer information stored in its files, such as for a loyalty program, or may transmit consumer information in its files to the system 10.

The unique identifier is linked to a consumer file $25_i$, which has stored consumer information such as authentication information, pre-qualified financial instruments for that consumer as determined by the pre-qualification processor 23 and any other information that the system 10 desires to store in the consumer file $25_i$. The consumer 12 typically is prompted by a voice response unit ("VRU") 32, or asked by the CSR 16, to provide some other information confidential to the consumer 12, such as a password, PIN, last 4 digits of his or her Social Security Number or any other security information. The entered authentication information is transmitted to the system of the third party 26 where it is compared to stored authentication information in the consumer file $25_i$. Authentication may take place in person by a check of the consumer's identification.

If authentication is successful, the consumer 12 is authenticated and the system of the third party 26 checks the consumer file $25_i$ to see if that consumer 12 has been pre-qualified for any financial instruments. If so, the system of the third party 26 may confirm the consumer's most current credit rating, and may also check a "suppression" database 28 that has identified consumers 12 that have become unqualified for financial offerings. In addition, the system of the third party 26 may run a fraud check on the consumer 12 at this time. If the credit check, "suppression" database 28 check and the fraud check are clear, this means that the consumer 12 is still qualified to be offered one or more financial instruments for which the consumer 12 was previously pre-qualified. The system of the third party 26 may also include an offering processor 30 that may be programmed to determine, according to the purpose of the consumer contact and any other predetermined conditions that the system operator may wish to include, whether a pre-qualified financial instrument should be offered to the consumer 12 during that contact. Pre-determined conditions may include such items as start date and expiration date of offers, or the channel or location of consumer contact.

Once the system of the third party 26 has determined that the consumer 12 should be offered a financial instrument, this offering information is transmitted by the system of the third party 26 back to the system 10. The offer of the financial instrument is made to the consumer 12 either by the CSR 16 or through VRU 32. The consumer 12 may indicate acceptance or refusal of the offer of the financial instrument either to the CSR 16 or by indicating by voice or by signal input his or her decline of the offer. The acceptance of the offer is preferably transmitted back to the system of the third party 26 where the information is noted in the suppression database 28 so that the consumer 12 will not be made additional offers of financial instruments without re-qualification.

If the consumer 12 accepts the offer, the acceptance is noted and transmitted back to the system of the third party 26 where the information is stored in the consumer file $25_i$. Acceptance may also be stored in the "suppression" database 28 at least until qualification of the consumer is re-performed. The CSR 16 or the voice response unit 32 informs the consumer 12 of any required financial disclosures according to the accepted financial instrument, and records the consumer's acceptance of any terms. Alternatively, any necessary disclosure may be performed by other methods such as providing the consumer 12 a form including the disclosures to print out, sign and fax back; directing the consumer 12 to a web page where he or she may indicate acceptance of the terms and conditions; or emailing the consumer 12 and allowing acceptance of the terms and conditions in a return email. This acceptance may be transmitted back to the system of the third party 26 where it is stored in the consumer file 25$_j$. Alternatively, the acceptance may be stored in a memory 33 for later batch processing to update the consumer file 25$_j$.

In one embodiment, the system 10 may include a database to store a temporary shell account 34 for the accepted financial instrument. Further, the system 10 may include an accepted offer processor 36 that determines the amount of the credit extended to the consumer 12 through the accepted financial instrument. The temporary shell account 34 may allow the consumer 12 to place a current charge to the accepted financial instrument, which may be stored until the permanent processing of the account takes place. The system 10 may also include an account assignment processor 38 that assigns an account number to the accepted financial instrument so that the consumer 12 may begin using the extended credit immediately.

Typically, the system 10 also includes a back-end account processor 40 that conducts the permanent processing of the accepted financial instrument. Such back-end processing includes a fraud check and preparation of a physical credential, such as a credit card, card member agreement or payment book, and other "welcome" information typically provided to consumers upon opening of a financial account.

The prospect database 22 typically accesses consumer information from a variety of sources. Such sources may include records of the financial institution 44, commercially available information 46 or other public information such as telephone or real estate records in locales, or court records 48. The pre-qualification processor 23 is programmed to evaluate the consumer information for creditworthiness for financial instruments for each consumer, and typically refers to information such as credit information. The pre-qualification processor 23 is programmed according to the standards of the offering financial institution to determine whether consumers pre-qualify for one or more financial instruments. In one embodiment of the system 10, the pre-qualification processor 23 pre-qualifies substantially all consumers for which it has consumer information for some financial instrument, thus increasing the probability of gaining a new customer account.

Figure 3:
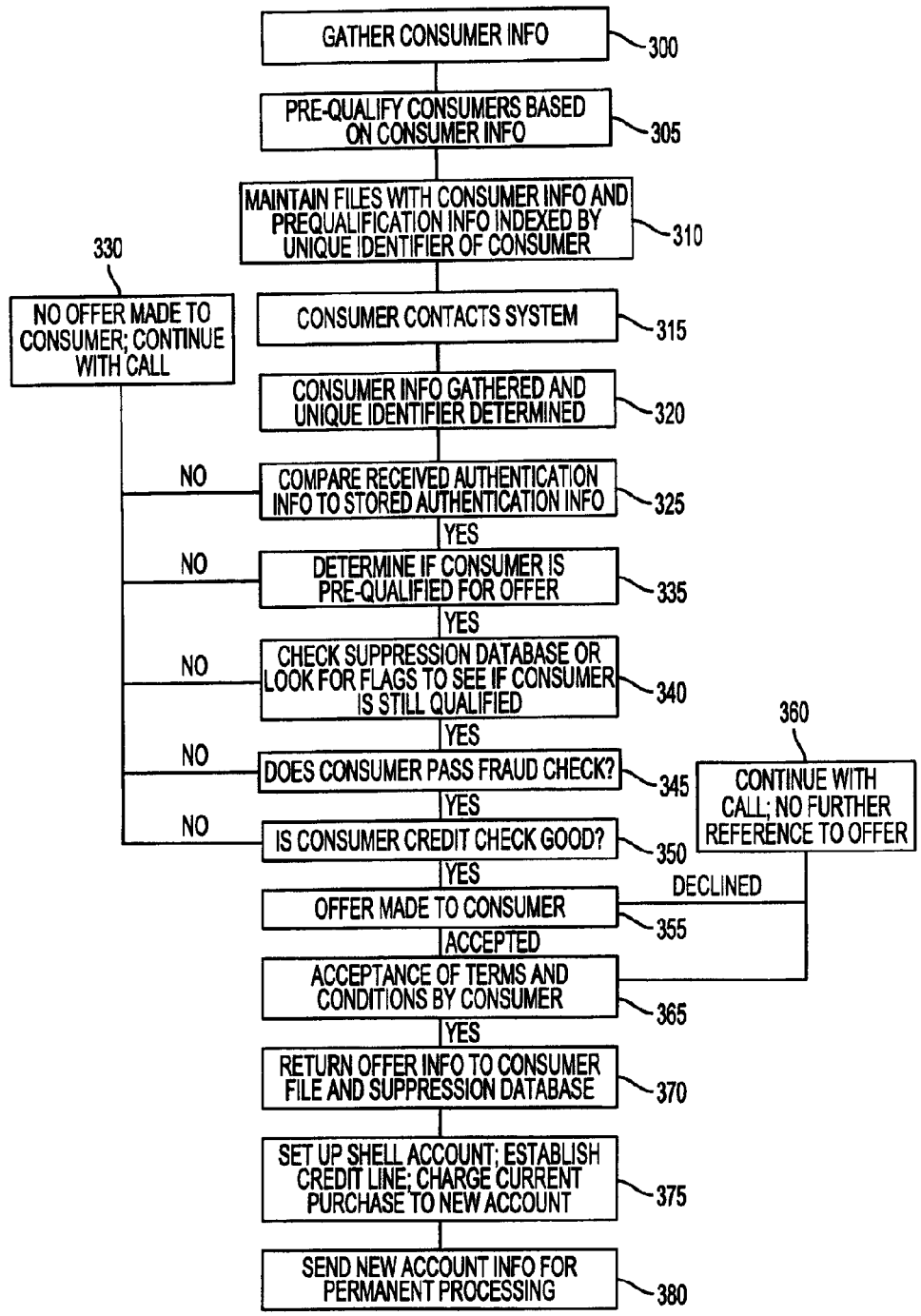
FIG. 3 is a flow diagram of one embodiment of the method of the invention where the system maintains the consumer files and determines if a consumer may be offered a pre-qualified financial instrument.

FIG. 3 depicts a flow diagram for the method of the system where the financial institution conducts the pre-qualification and maintains the consumer files. At Step 300, consumer information is gathered from a variety of sources by the financial institution. At Step 305, consumers are pre-qualified by the system for different financial instruments according to the standards of the financial institution. At Step 310, the system maintains files that contain at least some of the consumer information and pre-qualification information indexed by the unique identifier of the pre-qualified consumers. At Step 315, a consumer contacts the system, either directly or through a business partner that is in contact with the system. At Step 320, consumer information is gathered from the consumer in order to determine the unique identifier and also for authentication purposes. Such consumer information may also be gathered from previously stored files relating to the consumer, such as loyalty program files of the business partner. At Step 325, the system files are searched for a file indexed by the unique identifier and the received authentication information is compared to the stored authentication information. If no such file is found or if the authentication information does not favorably compare, at Step 330 the search is terminated and the call from the consumer continues without any offer or any mention of an offer of a financial instrument.

If at Step 325 a consumer file is located that is indexed by the unique identifier and the consumer is authenticated, at Step 335 the system determines if there is an entry in the consumer file indicating that the consumer has been pre-qualified for a financial instrument. At this point, the system may also determine if the pre-qualified financial instrument is appropriate for offering to the consumer based on the purpose and/or nature of the consumer contact. If no such file is found or if an offer is not appropriate based on the purpose and/or nature of the consumer contact, at Step 330 the search is terminated and the call from the consumer continues without any offer or any mention of an offer of a financial instrument.

If a pre-qualified financial instrument is located and offering is appropriate, at Step 340 the system checks the suppression database for any entries that indicate the consumer is no longer qualified to receive the offer. Alternatively or in addition, the consumer file may be checked for flags that indicate the consumer should not be offered one or more financial instruments. If there is an entry in the suppression database or a flag is found, at Step 330 the search is terminated and the call from the consumer continues without any offer or any mention of an offer of a financial instrument.

If no entry in the suppression database or no flag is found that indicates a financial instrument should not be offered to the consumer, at Step 345 the system conducts a fraud check on the consumer. If the consumer fails the fraud check, at Step 330 the search is terminated and the call from the consumer continues without any offer or any mention of an offer of a financial instrument.

If the consumer passes the fraud check, at Step 350 the consumer's credit may be checked again. If the consumer's credit is no longer acceptable, at Step 330 the search is terminated and the call from the consumer continues without any offer or any mention of an offer of a financial instrument.

If the consumer's credit remains acceptable, at Step 355 the financial instrument is offered to the consumer. If the consumer declines the offer, at Step 360 the call from the consumer continues with no further mention of the offer. If the consumer accepts the offer, at Step 365 the consumer is notified of the terms and conditions of the offer. If the consumer declines to accept the terms and conditions, at Step 360 the call from the consumer continues with no further mention of the offer. If the consumer accepts the terms and conditions, at Step 370 the accepted offer information is returned to the consumer file and/or suppression database. At Step 375 a shell account may optionally be setup and a credit line established for the accepted financial instrument. The current purchase, if applicable, may be charged to the new shell account. At Step 380, the new account information is sent for permanent processing.

Figure 4:
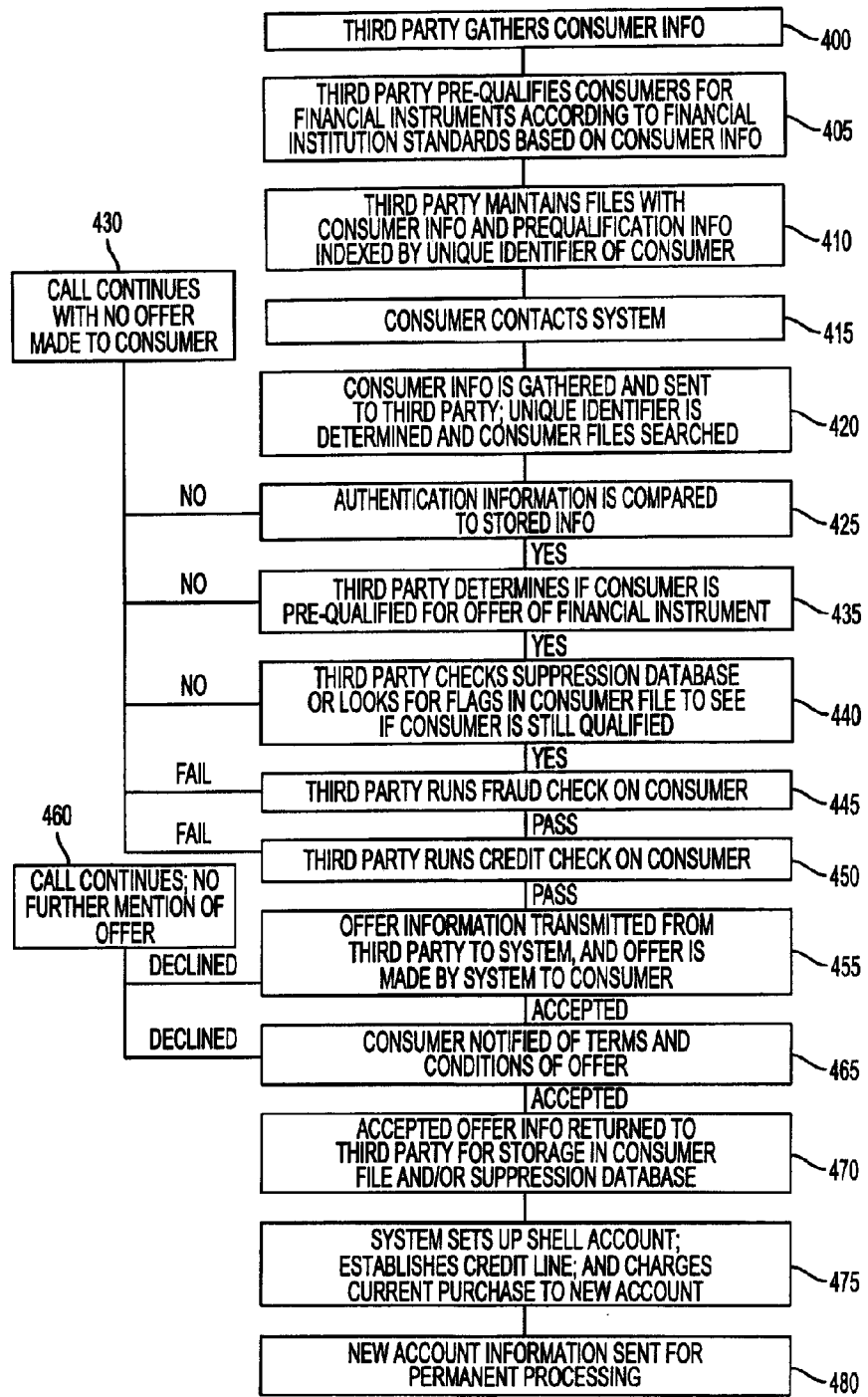
FIG. 4 is a flow diagram of another embodiment of the method of the invention where a third party maintains the consumer files and determines if a consumer may be offered a pre-qualified financial instrument.

FIG. 4 depicts a flow diagram for an alternative embodiment of the method of the system where a third party determines the pre-qualification and maintains consumer files. At Step 400, consumer information is gathered from a variety of sources by a third party, such as a credit bureau. At Step 405, consumers are pre-qualified by the system of the third party for different financial instruments according to the standards of the financial institution that will be offering the financial instrument. At Step 410, the third party maintains files that contain at least some of the consumer information and pre-qualification information indexed by the unique identifier of the pre-qualified consumers. At Step 415, a consumer contacts the system, either directly or through a business partner that is in contact with the system. At Step 420, consumer information is gathered by the system from the consumer in order to determine the unique identifier and also for authentication purposes. Such consumer information may also be gathered from previously stored files relating to the consumer, such as loyalty program files of the business partner. At Step 425, the gathered consumer information is transmitted to the system of the third party, which searches for a file indexed by the unique identifier. The received authentication information may be compared to the stored authentication information. If no such file is found or if the authentication information does not favorably compare, at Step 430 the search is terminated, the system of the third party notifies the system that no such file has been located and the call from the consumer continues without any offer or any mention of an offer of a financial instrument.

If at Step 425 a consumer file is located that is indexed by the unique identifier and the consumer is authenticated, at Step 435 the system of the third party determines if there is an entry in the consumer file indicating that the consumer has been pre-qualified for a financial instrument. At this point, the system of the third party may also determine if the pre-qualified financial instrument is appropriate for offering to the consumer based on the purpose and/or nature of the consumer contact, according to pre-determined standards and conditions determined by the financial institution. If no such file is found or if an offer is not appropriate based on the purpose and/or nature of the consumer contact, at Step 430 the search is terminated, the system of the third party notifies the system that no such offer exists and the call from the consumer continues without any offer or any mention of an offer of a financial instrument.

If a pre-qualified financial instrument is located and offering is found to be appropriate according to the pre-determined standards and conditions, at Step 440 the system of the third party checks the suppression database for any entries that indicate the consumer is no longer qualified to receive the offer. Alternatively or in addition, the consumer file may be checked for flags that indicate the consumer should not be offered one or more financial instruments. If there is an entry in the suppression database or a flag is found, at Step 430 the system of the third party notifies the system that the search is terminated and the call from the consumer continues without any offer or any mention of an offer of a financial instrument.

If no entry in the suppression database or no flag is found that indicates a financial instrument should not be offered to the consumer, at Step 445 the system of the third party conducts a fraud check on the consumer. If the consumer fails the fraud check, at Step 430 the system of the third party notifies the system that the search is terminated and the call from the consumer continues without any offer or any mention of an offer of a financial instrument.

If the consumer passes the fraud check, at Step 450 the consumer's credit may be checked again. If the consumer's credit is no longer acceptable according to predetermined standards and conditions of the financial institution, at Step 430 the system of the third party notifies the system that the search is terminated and the call from the consumer continues without any offer or any mention of an offer of a financial instrument.

If the consumer's credit remains acceptable, at Step 455 the system of third party transmits that information to the system, and the financial instrument is offered to the consumer by either a CSR or the VRU of the system. If the consumer declines the offer, at Step 460 the call from the consumer continues with no further mention of the offer. If the consumer accepts the offer, at Step 465 the consumer is notified of the terms and conditions of the offer. If the consumer declines to accept the terms and conditions, at Step 460 the call from the consumer continues with no further mention of the offer. If the consumer accepts the terms and conditions, at Step 470 the accepted offer information is transmitted back to the system of the third party to be returned to the consumer file and/or suppression database. At Step 475 a shell account may optionally be setup and a credit line established for the accepted financial instrument. The current purchase, if applicable, may be charged to the new shell account. At Step 480, the new account information is sent for permanent processing.

It is to be understood that the embodiment and variations shown and described herein are merely illustrative of the principles of this invention and that various modifications may be implemented by those skilled in the art without departing from the scope and spirit of the invention. The scope of the invention is to be determined from the claims appended hereto.

What is claimed is:

1. A computer implemented method for a third party to offer financial instruments to pre-qualified consumers, comprising:
    at least one computer processor at the third party, independent of a request by a consumer, retrieving financial information related to the consumer from at least one source of financial information;
    prior to the consumer conducting a transaction with a business partner of at least one of the financial institutions the at least one computer processor at the third party pre-qualifying the consumer for financial instruments offered by a plurality of financial institutions based on the retrieved financial information wherein standards for the pre-qualification for each financial instrument are set by the sponsoring financial institution;
    the at least one computer processor at the third party indexing the retrieved financial information and pre-qualification information indexed using a unique identifier that is assigned to the consumer and storing the indexed financial information and pre-qualification data in a database;
    the at least one computer processor at the third party receiving, from the business partner with which the consumer has conducted a transaction, consumer identification information that was collected from the consumer, the consumer identification information including a received unique consumer identifier, wherein the business partner is not one of the plurality of financial institutions;
    the at least one computer processor at the third party retrieving, from the database, retrieved financial information and pre-qualification information for the consumer using the received unique identifier;
    the at least one computer processor at the third party determining that the consumer is not identified in a suppression database that comprises identifying information for consumers that are no longer qualified for the financial instrument for which the consumer is pre-qualified; and
    the at least one computer, processor at the third party offering the financial instrument for which the consumer is pre-qualified to the consumer.

2. The method of claim 1, wherein the source of financial information is a credit bureau.

3. The method of claim 1, further comprising:
    the at least one computer processor at the third party retrieving updated information for the consumer;
    the at least one computer processor at the third party verifying that the consumer is qualified for the financial instrument for which the consumer is pre-qualified.

4. The method of claim 3, wherein the suppression database comprises a plurality of consumer files associated with the unique consumer identifier.

5. The method of claim 4, wherein pre-qualification of the consumer occurs prior to receipt of the consumer identification information.

6. The method of claim 1, wherein the pre-qualifying comprises checking at least one of a credit rating of the consumer, an income level of the consumer, a debt level of the consumer and a payment history of the consumer.

7. The method of claim 1, further comprising:
the at least one computer processor at the third party authenticating the consumer by comparing the retrieved consumer information and the received consumer identification information.

8. A computer implemented method for a third party to offer financial instruments to pre-qualified consumers, comprising:
prior to a consumer contact with a business partner of at least one of the financial institutions at least one computer processor at the third party, independent of any request from any of a plurality of consumers, pre-qualifying the plurality of consumer for financial instruments offered by a financial institution, wherein standards for the pre-qualification are set by the financial institution;
the at least one computer processor at the third party storing, in a database, consumer identification information and pre-qualification information for the plurality of consumers;
the at least one computer processor at the third party receiving, from the financial institution, collected consumer identification information that is collected from a consumer following contact by the consumer with the financial institution;
the at least one computer processor at the third party retrieving, from the database, consumer information and pre-qualification information for the consumer using the collected consumer identification information;
the at least one computer processor at the third party determining that the consumer is not identified in a suppression database comprising identifying information for consumers that are no longer qualified for the financial instrument for which the consumer is pre-qualified; and
the at least one computer processor at the third party notifying the financial institution of the financial instruments for which the consumer is pre-qualified.

9. The method of claim 8, wherein the pre-qualification information stored in the database is indexed using a unique identifier that is assigned to the consumer.

10. The method of claim 8, wherein the collected consumer identification information comprises a received unique consumer identifier.

11. The method of claim 8, wherein the pre-qualification occurs before the consumer contacts the financial institution.

12. The method of claim 8, wherein the third party is a credit bureau.

13. A computer implemented system for a third party to offer financial instruments to pre-qualified consumers, comprising:
at least one computer processor at the third party; and
an executable computer program that is tangibly embodied on a nontransitory computer readable medium, which causes the at least one computer processor to perform the following:
independent of a request by a consumer, retrieve financial information related to the consumer from at least one source of financial information;
prior to the consumer conducting a transaction with a business partner of at least one of the financial institutions, pre-qualify the consumer for financial instruments offered by a plurality of financial institutions based on the retrieved financial information, wherein standards for the pre-qualification for each financial instrument are set by the sponsoring financial institution;
index the retrieved financial information and pre-qualification information indexed using a unique identifier that is assigned to the consumer and store the indexed financial information and pre-qualification data in a database;
receive, from the business partner with which the consumer has conducted a transaction, consumer identification information that was collected from the consumer, the consumer identification information including a received unique consumer identifier, wherein the business partner is not one of the plurality of financial institutions;
retrieve, from the database, retrieved financial information and pre-qualification information for the consumer using the received unique identifier;
determine that the consumer is not identified in a suppression database that comprises identifying information for consumers that are no longer qualified for the financial instrument for which the consumer is pre-qualified; and
offer the financial instrument for which the consumer is pre-qualified to the consumer.

14. The system of claim 13, wherein the source of financial information is a credit bureau.

15. The system of claim 13, wherein the executable computer program further performs the following:
retrieve updated information for the consumer;
send the updated information to the third party.

16. The system of claim 13, wherein pre-qualification standards for a financial instrument are provided to the third party before consumer identification information is collected from the consumer.

17. The method of claim 1, wherein the consumer is not a customer of the financial institution that sponsors the financial instrument for which the consumer is pre-qualified.

* * * * *